(12) United States Patent
Placiakis et al.

(10) Patent No.: US 10,037,500 B2
(45) Date of Patent: Jul. 31, 2018

(54) SYSTEM AND METHOD FOR AUTOMATIC SHRINKAGE FORECASTING

(71) Applicant: Genesys Telecommunications Laboratories, Inc., Daly City, CA (US)

(72) Inventors: Vidas Placiakis, Walnut Creek, CA (US); Vytautas Staraitis, Castro Valley, CA (US); Vytautas Saulis, Castro Valley, CA (US); Gintautas Budvytis, Castro Valley, CA (US); Laura Stevens, Manchester (GB); Thomas Tritten, II, Charlotte, NC (US); Michele Fisher, Mountain Vew, CA (US)

(*) Notice: Subject to any disclaimer, the term of this patent is extended or adjusted under 35 U.S.C. 154(b) by 296 days.

(21) Appl. No.: 13/872,027

(22) Filed: Apr. 26, 2013

(65) Prior Publication Data
US 2014/0324499 A1    Oct. 30, 2014

Related U.S. Application Data

(60) Provisional application No. 61/815,726, filed on Apr. 24, 2013.

(51) Int. Cl.
  *G06Q 10/06* (2012.01)
(52) U.S. Cl.
  CPC .......................... *G06Q 10/063116* (2013.01)
(58) Field of Classification Search
  CPC ......... G06Q 10/00; G06Q 10/06; G06F 17/60
  USPC ........................................................ 705/7.16
  See application file for complete search history.

(56) References Cited

U.S. PATENT DOCUMENTS

| | | | | |
|---|---|---|---|---|
| 6,823,315 | B1* | 11/2004 | Bucci et al. | 705/7.16 |
| 8,326,667 | B2* | 12/2012 | Johnson | 705/7.13 |
| 2010/0119053 | A1* | 5/2010 | Goeldi | G06Q 10/00 379/265.09 |
| 2013/0024389 | A1* | 1/2013 | Gupta | G06Q 30/0201 705/319 |
| 2013/0080202 | A1* | 3/2013 | Cameron et al. | 705/7.16 |
| 2015/0149373 | A1* | 5/2015 | Chhaya | G06Q 30/0282 705/319 |
| 2015/0379586 | A1* | 12/2015 | Mooney | G06O 30/0277 705/14.73 |

(Continued)

OTHER PUBLICATIONS

Morrell, Steve, Industry Insider Guide Workforce Management, 1134 v.1 9/03-U.S, 2003, Genesys Telecommunications, Inc., www.genesyslab.com, 30 pgs.

*Primary Examiner* — Romain Jeanty

(57) ABSTRACT

A system and method for forecasting shrinkage of employees is provided. According to one embodiment, scheduled shrinkage values are identified from a work schedule and stored in a data file. A command is received by a processor to predict shrinkage of employees for a future forecast period. Selection of the data file is received, and in response, the processor is configured to automatically populate shrinkage fields for the forecast period with the scheduled shrinkage values retrieved from the data file. According to one embodiment, the scheduled shrinkage values are set as the shrinkage values that are forecast for the forecast period. A work schedule of employees is the generated for the forecast period taking into account the forecast shrinkage values. According to one embodiment, the processor may also engage of automatic shrinkage forecasting based on analysis of historic shrinkage data.

20 Claims, 17 Drawing Sheets

(56) References Cited

U.S. PATENT DOCUMENTS

| | | | |
|---|---|---|---|
| 2016/0034922 A1* | 2/2016 | Chhaya | G06Q 30/0201 705/7.29 |
| 2016/0189174 A1* | 6/2016 | Heath | G06Q 30/0201 705/7.29 |
| 2016/0196561 A1* | 7/2016 | Iyer | G06O 30/016 705/304 |

* cited by examiner

| Edit Actions | | |
|---|---|---|
| | Name ~600 | Type ~602 Associated ~604 |
| 343434 | | Overheads RN - Telefon og nettbank |
| BM - ip møter og annet | | Overheads RN - Telefon og nettbank |
| BM - ip sykefravær | | Overheads RN - Telefon og nettbank |
| BM - p Ferie | | Overheads RN - Telefon og nettbank |
| Good week | | Overheads RN - Telefon og nettbank |
| KS - Alt - max occupancy | | Maximum occupancy RN - Telefon og nettbank |
| KS - E/Chat - Servicegrad | | Service Level % RN - Telefon og nettbank |
| KS - ip avspassering | | Overheads RN - Telefon og nettbank |
| KS - ip behandlinger | | Overheads RN - Telefon og nettbank |
| KS - ip permisjon m lønn | | Overheads RN - Telefon og nettbank |
| KS - ip sykefravær | | Overheads RN - Telefon og nettbank |
| KS - Møter | | Overheads RN - Telefon og nettbank |
| KS - p Ferie | | Overheads RN - Telefon og nettbank |
| | | * * * * * |

| Data | Graph | Activities |
|---|---|---|

| Name: | 343434 |
|---|---|
| Associated: | RN - Telefon og nettbank |
| Type: | Overheads |
| Total/Average: | 3.41 |

Daily Values

606

| Time steps | Monday Value | Tuesday Value | Wednesday Value | Thursday Value | Friday Value | Saturday Value | Sunday Value |
|---|---|---|---|---|---|---|---|
| 12:00 AM | 4.96 | 4.71 | 4.69 | 4.02 | 4.00 | 0.74 | 0.71 |
| 12:15 AM | 7.59 | 6.98 | 6.42 | 5.45 | 5.26 | 0.77 | 0.74 |
| 12:30 AM | 7.59 | 6.98 | 6.42 | 5.45 | 5.26 | 0.77 | 0.74 |
| 12:45 AM | 7.59 | 6.98 | 6.42 | 5.45 | 5.26 | 0.77 | 0.74 |
| 1:00 AM | 7.59 | 6.98 | 6.42 | 5.45 | 5.26 | 0.77 | 0.74 |
| 1:15 AM | 7.59 | 6.98 | 6.42 | 5.45 | 5.26 | 0.77 | 0.74 |
| 1:30 AM | 7.59 | 6.98 | 6.42 | 5.45 | 5.26 | 0.77 | 0.74 |
| 1:45 AM | 7.59 | 6.98 | 6.42 | 5.45 | 5.26 | 0.77 | 0.74 |
| 2:00 AM | 7.59 | 6.98 | 6.42 | 5.45 | 5.26 | 0.77 | 0.74 |

| Time steps | 2/13/12 Shrinkage % | 2/14/12 Shrinkage % | 2/15/12 Shrinkage % | 2/16/12 Shrinkage % | 2/17/12 Shrinkage % |
|---|---|---|---|---|---|
| | 4.96 | 0.83 | 4.69 | 4.02 | 0.42 |
| 6:00 AM | 7.59 | 0.00 | 6.42 | 5.45 | 0.00 |
| 6:15 AM | 7.59 | 0.00 | 6.42 | 5.45 | 0.00 |
| 6:30 AM | 7.59 | 0.00 | 6.42 | 5.45 | 0.00 |
| 6:45 AM | 7.59 | 0.00 | 6.42 | 5.45 | 0.00 |
| 7:00 AM | 6.67 | 0.00 | 6.09 | 5.13 | 0.00 |
| 7:15 AM | 6.67 | 0.00 | 6.09 | 5.13 | 0.00 |
| 7:30 AM | 6.52 | 0.00 | 5.93 | 4.96 | 0.00 |
| 7:45 AM | 4.35 | 0.00 | 4.37 | 3.70 | 0.00 |
| 8:00 AM | 2.61 | 5.00 | 2.86 | 2.46 | 0.00 |
| 8:15 AM | 2.61 | 5.00 | 2.86 | 2.46 | 0.00 |
| 8:30 AM | 2.60 | 5.00 | 2.85 | 2.44 | 0.00 |
| 8:45 AM | 2.68 | 5.00 | 2.90 | 2.45 | 0.00 |
| 9:00 AM | 2.64 | 0.00 | 2.90 | 2.39 | 0.00 |
| 9:15 AM | 2.75 | 0.00 | 3.13 | 2.58 | 0.00 |
| 9:30 AM | 2.64 | 5.00 | 2.80 | 2.41 | 0.00 |
| 9:45 AM | 2.78 | 5.00 | 2.86 | 2.56 | 0.00 |
| 10:00 AM | 2.69 | 5.00 | 2.92 | 2.41 | 0.00 |
| 10:15 AM | 2.79 | 5.00 | 3.02 | 2.55 | 0.00 |
| 10:30 AM | 2.68 | 0.00 | 3.06 | 2.74 | 0.00 |
| 10:45 AM | 2.86 | 0.00 | 3.56 | 2.92 | 0.00 |
| 11:00 AM | 2.90 | 0.00 | 3.29 | 2.47 | 0.00 |
| 11:15 AM | 2.72 | 0.00 | 2.85 | 2.35 | 0.00 |
| 11:30 AM | 2.80 | 0.00 | 2.74 | 2.50 | 0.00 |
| 11:45 AM | 3.00 | 0.00 | 2.79 | 2.76 | 0.00 |

SYSTEM AND METHOD FOR AUTOMATIC SHRINKAGE FORECASTING

CROSS REFERENCE TO RELATED APPLICATIONS

This application claims the benefit of U.S. Provisional Application No. 61/815,726, filed on Apr. 24, 2013, the content of which is incorporated herein by reference.

BACKGROUND

Staff costs in a contact center account for a big portion, often 60-70% of the contact center's total expenditure. It is desirable, therefore, to predict the amount of work that will come into a contact center and match it with the right staff ratio. However this can be a complex and time-consuming job. When variables such as staff absences and other workforce shrinkages are put into the mix, accuracy rates may go down, leaving contact centers over- or under-staffed. This could result in wasted money and/or loss of potential revenues. Accordingly, what is desired is a system and method for aiding the forecast of predicted shrinkages of the workforce to appropriately staff the contact center.

SUMMARY

Embodiments of the present invention are directed to a system and method for forecasting shrinkage of employees. The system according to one embodiment includes a processor and memory. The memory stores instructions which, when executed by the processor, cause the processor provide certain workforce management functionality. In providing such functionality, a first shrinkage value forecast for a first time period is identified. The first shrinkage value is based on a number of employees predicted to be unavailable for a work activity during the first time period. A scheduled shrinkage value is also computed for the first time period. The scheduled shrinkage value is based on a number of employees arranged in a first work schedule to be in a particular non-working state during the first time period. The scheduled shrinkage value is stored in a data file. According to one embodiment, a command is received to predict shrinkage of employees, where the command is associated with a second time period. Selection of the data file is received, and in response, the processor is configured to automatically populate a shrinkage field for the second time period with the scheduled shrinkage value retrieved from the data file. According to one embodiment, the scheduled shrinkage value is set as a second shrinkage value forecast for the second time period. A second work schedule of employees is generated for the second time period taking into account the second shrinkage value.

According to one embodiment, the non-working state is selected from a group consisting of break, meal, vacation, time-off, training, and meeting.

According to one embodiment, the processor is further configured to calculate staffing need for the second time period based on the shrinkage value forecast for the second time period, wherein the second work schedule is based on the calculated staffing need.

According to one embodiment, the processor is further configured to receive a second command to predict shrinkage, the second command being associated with a third time period; automatically forecast a third shrinkage value for the third time period based on historical data of past shrinkage values collected for the contact center; and generate a third schedule of employees for the third time period, the third work schedule taking into account the third shrinkage value.

According to one embodiment, the automatically forecasting includes identifying shrinkage patterns based on the historical data. The patterns may relate to shrinkage types, shrinkage levels, and shrinkage periods. The shrinkage patterns may be associated with an event.

According to one embodiment, the processor is further configured to monitor actual shrinkage during a first portion of the second time period; re-forecast a shrinkage value for a second portion of the second time period; and update the second work schedule for the second portion of the second time period based on the re-forecasted shrinkage value.

According to one embodiment, the second time period includes a plurality of time intervals, wherein the shrinkage value forecast for a first one of the time intervals is different from a shrinkage value forecast for a second one of the time intervals.

According to one embodiment, the second work schedule assigns an employee to a preset non-working state, and the processor may be configured to identify cancellation of the non-working state and update the second work schedule based on the cancellation.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIGS. 4-7 are exemplary screen shots of a supervisor GUI for forecasting shrinkage for the workforce according to one embodiment of the invention;

Figure 8:
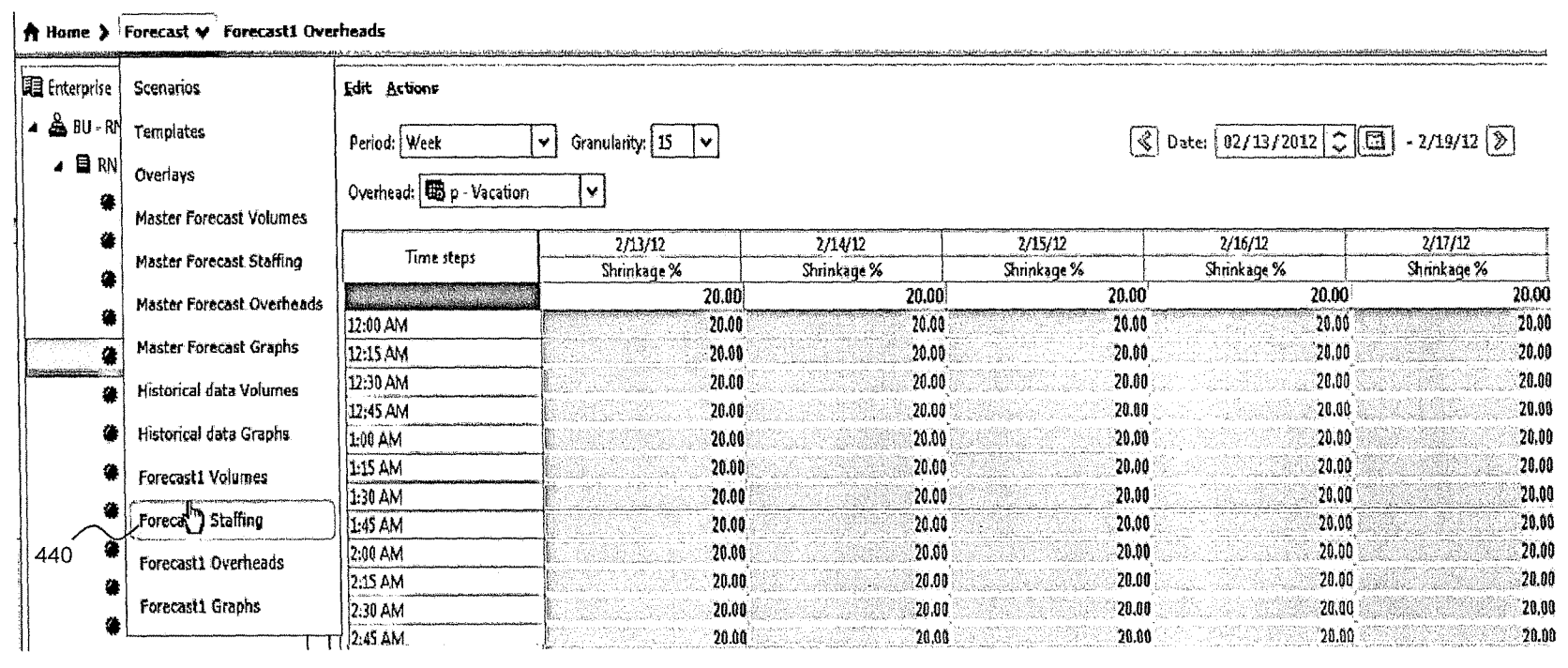

FIGS. 8-11 are exemplary screen shots of a supervisor GUI for forecasting staffing according to one embodiment of the invention;

FIG. 15 is a screen shot of an exemplary list of available templates available for selection by a supervisor according to one embodiment of the invention;

FIG. 17 is an exemplary screen shot of a forecast shrinkage screen displaying forecast shrinkage values based on the templates selected in FIG. 16 according to one embodiment of the invention.

DETAILED DESCRIPTION

Figure 1:
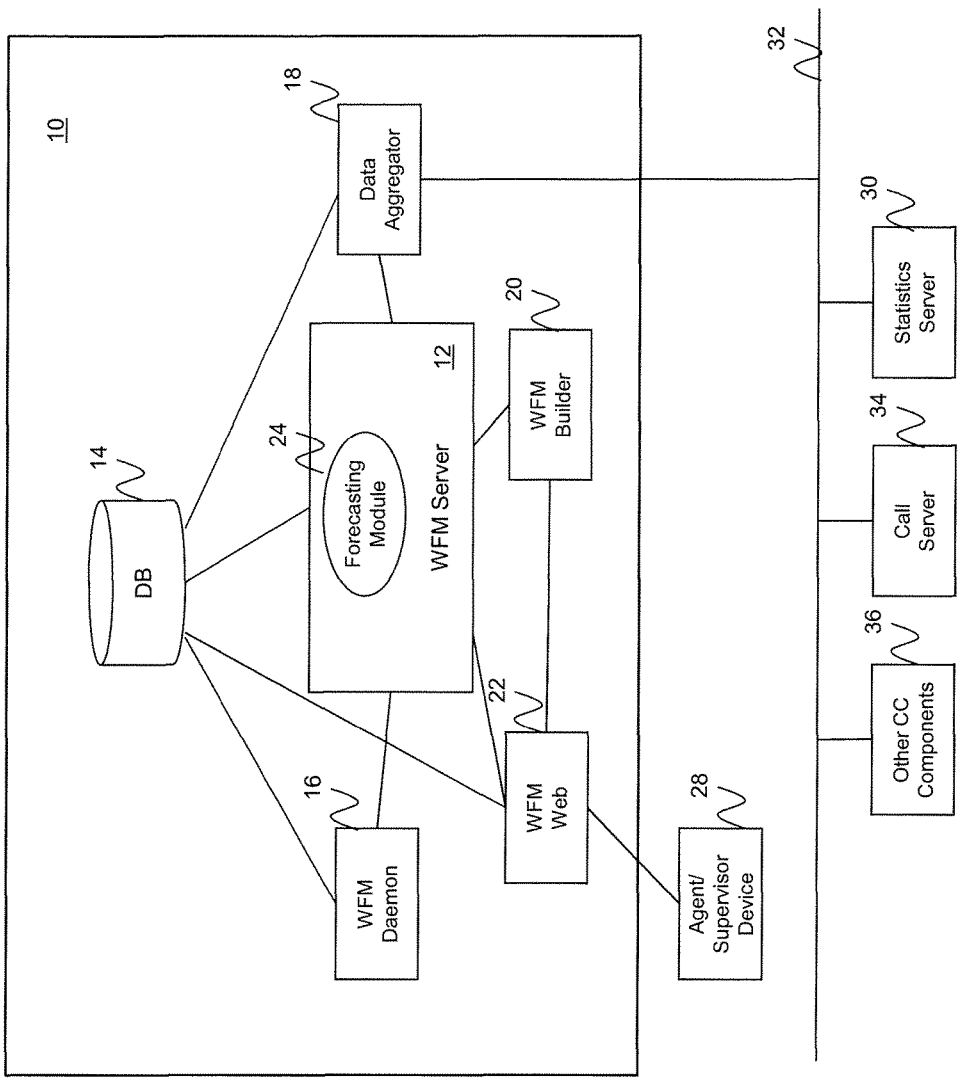
FIG. 1 is a schematic block diagram of a workforce management (WFM) system according to one embodiment of the invention.

In general terms, embodiments of the present invention are directed to a system and method for workforce management (WFM) for a contact center that takes into account planned and unplanned shrinkage (also referred to as overhead) of the workforce. Workforce management typically includes forecasting, scheduling, adherence monitoring, and performance analysis. Forecasting may involve prediction of workforce shrinkage, interaction volume, and average handling time, for a future period, whether that period is several hours, weeks, or months in the future. According to one embodiment, one or more templates may be provided for engaging in forecasting. Forecasting may also involve, in addition or in lieu of such templates, an analysis of historical data for making new predictions or refining existing predictions. In this regard, an analysis and understanding of what has happened in the past may be used for making future forecasts that take into account real world situations.

After predictions of the future are made via forecasts, a workforce schedule that takes into account such forecasts may be generated. A schedule may be an arrangement of shifts, breaks, meals, exceptions (which includes any activity where the agent is not performing work), and the like, for different contact center employees, based on predicted workload and available pool of employees (also referred to as agents). According to one embodiment, the schedule takes into account various overheads such as, for example, breaks, meals, meetings, training classes, sick days, vacations, holidays, and the like, to determine how many agents should be scheduled for a particular scheduling period. Planned shrinkage that is specifically known in advance may be optimized during schedule generation. Examples of such planned shrinkage include, for example, meetings, vacations, training classes, and the like.

According to one embodiment, after a schedule is generated and published for a particular time period and specific agents are assigned to the schedule, the WFM system may be configured to monitor real-time adherence to the schedule. Adherence information includes, for example, information on how closely a particular agent behavior matches (or complies with) the schedule. The WFM system may be configured with the length of time that an agent can deviate from the schedule and continue to comply.

A performance analysis may be undertaken based on the adherence monitoring, for determining the extent that actual agent performance corresponds with the forecast and scheduled values. The WFM system may recommend adjusting the number of agents working on a specific activity if the service-level statistics for that activity have fallen out of the acceptable range. If, however, the service levels are more than satisfactory, agents may be prompted to spend additional time upselling new products, be moved to another activity, or even given time off. Reports may also be generated based on the performance analysis.

Embodiments of the present invention are directed generally to a system and method for forecasting shrinkage of employees. According to one embodiment, scheduled shrinkage values are identified from a work schedule and stored in a data file. A command is received by a processor to predict shrinkage of employees for a future forecast period. Selection of the data file is received, and in response, the processor is configured to automatically populate shrinkage fields for the forecast period with the scheduled shrinkage values retrieved from the data file. According to one embodiment, the scheduled shrinkage values are set as the shrinkage values that are forecast for the forecast period. A work schedule of employees is the generated for the forecast period taking into account the forecast shrinkage values. According to one embodiment, the processor may also engage of automatic shrinkage forecasting based on analysis of historic shrinkage data.

FIG. 1 is a schematic block diagram of a workforce management (WFM) system 10 according to one embodiment of the invention. In the illustrated embodiment, the WFM system is configured to unify forecasting, employee scheduling, calendar management, monitoring of real-time agent adherence, monitoring of intra-day contact-center performance, and historical reporting, into a robust contact center resource-planning application.

The WFM system 10 includes a WFM server 12 coupled to a mass storage device 14, WFM daemon 16, WFM data aggregator 18, WFM builder 20, and WFM web component 22. The mass storage device 14 may be any hard disk drive or drive array for storing relevant configuration, forecasting, scheduling, agent adherence, performance, and historical data related to WFM. The WFM server 12 may be configured to process, store, and retrieve such data from the mass storage device 14 based on requests from the WFM web component 22. For example, the WFM web component 22 may receive requests from agents and supervisors relating to workforce management, and forward those requests to the WFM server 12 for processing. According to one embodiment, the WFM server 12 includes a forecasting module 24. The module 24 may be implemented via computer program instructions stored in memory which, when executed by a processor, cause the processor to provide various forecasting functionalities including the ones described herein. The WFM server 12 may also include other modules for providing other WFM functionality, such as, for example, an adherence module (not shown) for real-time monitoring of adherence to a schedule by the contact center employees, and/or a performance module for analyzing performance of the employees.

According to one embodiment, the WFM daemon 16 is a background process which connects to a configuration server (not shown) for authentication, configuration, and connection to other servers. The WFM data aggregator 18, WFM builder 20, and WFM web component 22 may be implemented as separate servers each having a processor and memory configured with instructions to perform the functionality of each WFM component. Of course, the functionality of one or more of the WFM components may be combined into a single server as a person of skill in the art will appreciate.

According to one embodiment, the WFM data aggregator 18 is configured, for example, to collect data for each contact center activity, such as, for example, interaction volume, abandonment percentage, quality of service, and average handling time for those interactions. In this regard, the WFM data aggregator 18 is coupled to contact center components, such as, for example, a statistics server 30, call server 34 (configured to route telephony calls for the contact center), and/or other contact center components 36 such as, for example, a configuration server, over a data communications network 32. The data communications network 32 may a local area network, a private wide area network, a public wide area network (e.g. the Internet), or the like, accessible via any wired or wireless technology conventional in the art.

The WFM builder 20 is configured to build employee schedules for a particular time period, which may be a single day, week, month, or any other time period.

The WFM web component 22 is configured to provide access to WFM functionality to supervisors and agents accessing the web component via supervisor and agent end devices 28. Such devices may be desktop computers, laptops, smart phones, and/or any other wired or wireless computing devices conventional in the art.

In one example, the WFM web component 22 provides a supervisor graphical user interface (GUI) accessible to supervisors via the supervisor end device to create forecasts, create and monitor schedules, make schedule changes, view and approve or deny schedule trade requests, view contact center performance, monitor real-time agent adherence, and view reports. In another example, the WFM web component 22 provides an agent GUI accessible to agents via the agent end device to check built schedules for scheduled activities and working hours, communicate preferred shift, working hours, and time-off requests to administrators, and make schedule trades with other agents.

Figure 2:
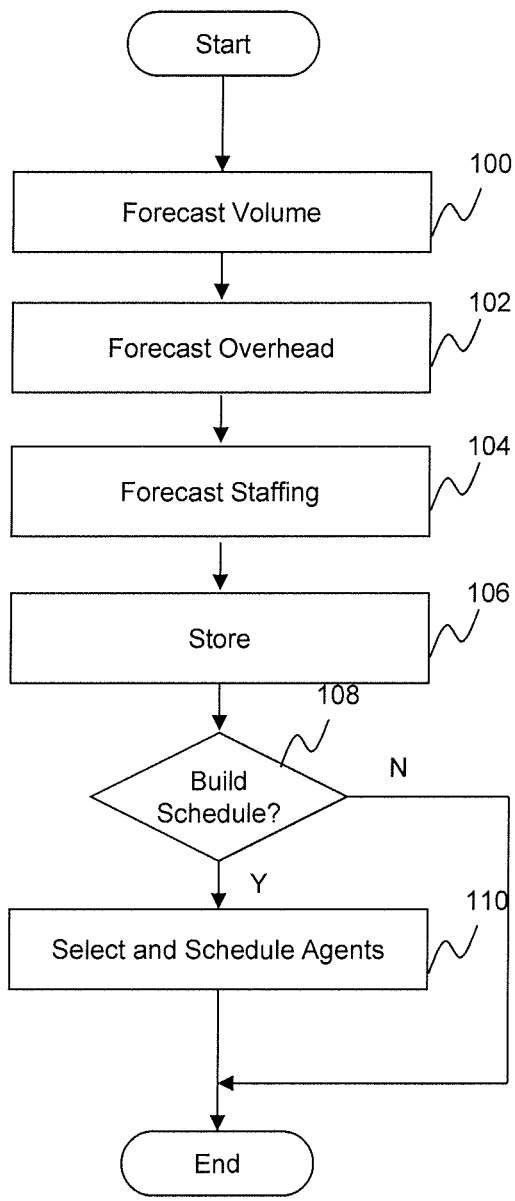
FIG. 2 is a flow diagram of a process for forecasting and generating schedules for staffing a contact center according to one embodiment of the invention.

FIG. 2 is a flow diagram of a process for forecasting and generating schedules for staffing a contact center according to one embodiment of the invention. Workload and staffing forecasts may be created for each activity. According to one embodiment, activities are different categories of work that comprise the total workload for a contact center. Schedules may also be created for each activity.

The process of FIG. 2 starts with a supervisor invoking the supervisor end device 28 to access the supervisor GUI provided by the WFM web component 22, and to select one or more options to engage in forecasting of workload and staffing for the contact center for a particular time period. A time period is used, in one example, to refer to particular days as well as the time intervals (e.g. hours, minutes, etc.) within those days. Of course, a time period may also refer to other time units such as weeks, months, and the like.

According to one embodiment, the forecasting module 24 is invoked for generating various forecasts. The forecasts may include making predictions relating to interaction volume, overhead, and staffing, for a particular forecast period. For example, if 1000 calls are anticipated between 9:00 am and 9:15 am on Apr. 18, 2013, the predicted interaction volume for this period is 1000. The predicted staffing that is calculated to be needed to handle the 1000 calls, may be, for example, 100 agents. However, if 10% of agents are predicted to not be available to handle the calls, the forecast staffing need may be 110 agents instead of 100. The prediction of 10% is a shrinkage prediction, and may be due to agents taking vacations, calling in sick, or being engaged in other exceptions which may not be considered to be a work activity, such as, for example, training, meetings, breaks, meals, and other non-working states, resulting in shrinkage in the actual number of agents who are available to do the work.

In this regard, in step 100, the forecasting module 24 invokes a volume forecast algorithm to forecast the interaction volume for a specified forecasting period. According to one embodiment, the WFM data aggregator 18 is configured to track events that may affect interaction volume. An event such as a sales promotion or marketing campaign, for example, may cause a predictable peak in interaction volume. Such events are entered in the WFM web component 12 and may be used by the forecasting module 24 for forecasting interaction volumes. If an event recurs, the forecasting module 24 may be configured to learn the impact of that event and account for its impact in future forecasts.

In step 102, the forecasting module 24 invokes a shrinkage forecast algorithm to forecast employee overhead for the specified forecasting period. Overhead forecasting, as well as the volume and staffing forecasting, may be done in response to a command transmitted by the a supervisor when a corresponding option is selected from the supervisor GUI provided by the WFM web component. The command is associated with a particular time period for which the forecast is to be done, along with the type of forecasting.

According to one embodiment, workforce shrinkage values may be predicted and entered manually by the administrator for each forecast time period. The forecast time period may be broken down to specific time intervals for each forecast day. For example, shrinkage forecasts may be made for each 15 minute interval of a day.

In one embodiment, in addition or in lieu of manually inputting employee shrinkage values, such values are automatically determined for a forecast period, and shrinkage fields associated with particular time intervals automatically populated with these values based on selected templates (also referred to as data files), historical analysis, and/or a combination of both. According to one embodiment, templates may be generated from scheduled shrinkage values that are input into a schedule when a schedule is built. As discussed above, schedules are built based on forecasts. The schedules may depict certain agents as being in a scheduled state which is not related to work. The schedule may also depict when and how long the agent was scheduled to be in that particular, non-working schedule state, which may be more or less than the forecast shrinkage value for that particular time period. The shrinkage values calculated from a particular schedule for each time interval may be stored in a template data file in the mass storage device 14 upon command by the supervisor. For example, if the supervisor feels that the scheduled shrinkage values are a good representation of shrinkage generally for the contact center, he or she may save the scheduled shrinkage values in a template and use them as forecast shrinkage values for a later forecasting period.

In step 104, the WFM server 12 may forecast staffing needs for the contact center based on the forecast volume, forecast overhead, and/or other considerations which will be apparent to a person of skill in the art, such as, for example, service objectives of the contact center. According to one embodiment, the forecasting module 24 invokes a staffing algorithm which may be, for example, a modified Erlang algorithm, to derive the forecast staffing needs.

In step 106, the WFM server 12 stores the various forecasts in the mass storage device 14. The forecasts may then be available for use in building schedules for the forecast period.

In step 108, a determination is made as to whether a schedule is to be built. A supervisor may interface with the supervisor GUI provided by the WFM web component 22 to indicate that a schedule is desired for a particular time period, which may be a current time period or a period occurring in the future. If a schedule is to be built, the WFM builder 20, in step 110, generates agent assignments for the particular time period, including assignments of agents to different shifts, activities, and the like. Agent assignments are based on the forecast and configured to comply with any business constraints defined for the contact center. Exemplary schedule constraints may include, without limitation, available personnel with required skills, staffing requirements, employment contracts, business policies, and/or agent preferences.

According to one embodiment, the WFM builder is configured to ensure the least amount of over- and understaffing while still meeting contractual obligations. According to one embodiment, the WFM builder 20 uses each agent's individual skills, contracted working rules, and calendar items as guides to help identify when each agent can work, and what he or she will work on.

Individual agent preferences may also be considered when building a schedule. For example, agents may enter preferences for shifts, days off, availability, and time off using the WFM web component 22 for agents. Supervisors may enter agent preferences in the WFM web component for supervisors and, with the appropriate security permissions, may grant or reject preferences. If a supervisor grants a preference, the WFM builder 20 is configured to consider the preference when building the schedule, along with various other criteria such as seniority. According to one embodiment, the WFM builder 20 aids compliance with regional working rules by helping to apply the following aspects of contract rules: 1) user-defined weekend days; 2) schedule synchronization based on specific days of the week; and 3) maximum number of consecutive weekends an agent may work.

According to one embodiment, agents may be scheduled to perform multiple types of work at once, or scheduled to work on specific types of work for periods of time within their day. When a schedule is finalized, the WFM builder publishes the schedule and stores it in the mass storage device 14.

Figure 3:
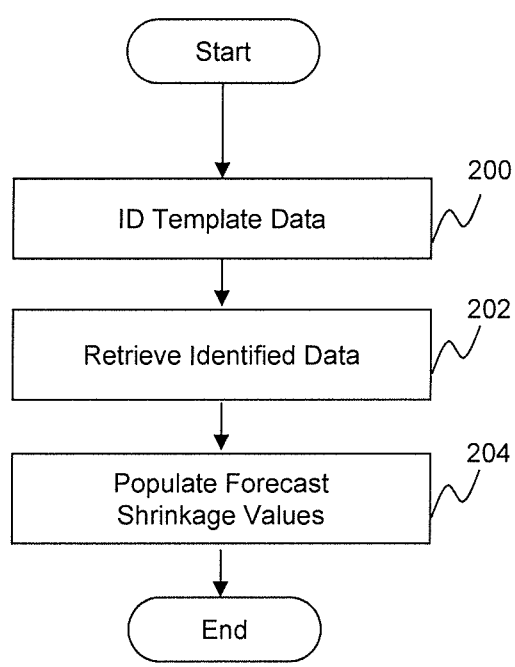
FIG. 3 is a flow diagram of forecasting employee overhead according to one embodiment of the invention.
Figure 4:
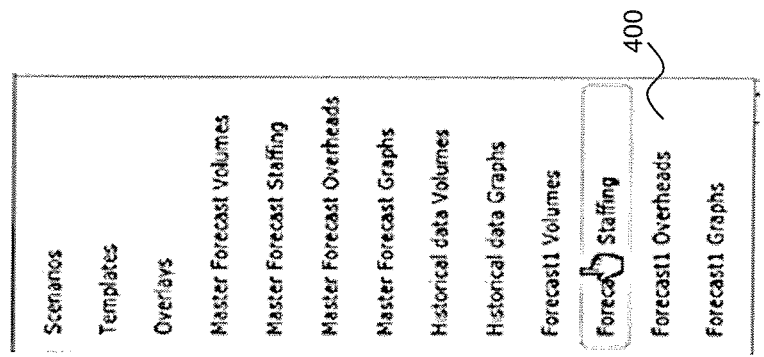

FIG. 3 is a more detailed flow diagram of step 102 for forecasting employee overhead according to one embodiment of the invention. According to one embodiment, shrinkage forecasting is based on templates generated from scheduled shrinkage. In one embodiment, calculation of the scheduled shrinkage is based on the number of employees that are scheduled to be in a particular shrinkage state (e.g. vacation, break, meal, training, etc.). For example, if 10 agents are assigned to a particular time period, and 5 out of the 10 agents are scheduled to be in training at that particular time period, the scheduled shrinkage for training at that time period is 50%.

In one exemplary embodiment, a supervisor who deems the scheduled shrinkage for a particular time period to be a good reflection of actual shrinkage may want to use the scheduled shrinkage values as shrinkage forecast values for the future. In this regard, the generating of templates starts with identifying the source data for the templates. Identification of the source data may be based on input from the supervisor via the supervisor GUI provided by the WFM web component 22. The data may identify, among other things, the source dates and activity for which scheduled shrinkage is to be obtained. The forecasting module 24 is configured to retrieve the scheduled shrinkage values from the mass storage device 14 for the selected activity and time periods, and save the retrieved values as a new template data file having a template name that is assigned by the supervisor.

The stored template is then ready for use for future shrinkage forecasts. In this regard, in step 200, the forecasting module 24 identifies selection of a particular template, as well as a time period to be forecast, and days during the time period for which template values are to be applied. For example, template values associated with particular days (e.g. Monday and Wednesday) may be specified by the supervisor for use as forecasted shrinkage values for the same days during the forecast period.

In step 202, the forecasting module retrieves the shrinkage values stored in the selected template for the identified days, and in step 204, automatically populates the shrinkage fields for the forecast time period and for the selected days, with the retrieved shrinkage values. As an example, the automatically populating is done for each time interval of the day that is to be populated.

In step 206, the forecasting module stores in the mass storage device the populated values as the forecast overhead for the forecast time period.

The process of FIGS. 2 and 3 may each be described in terms of a software routine executed by a processor based on instructions stored in memory. A person of skill in the art should recognize, however, that the routine may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art.

According to one embodiment, step 102 of FIG. 2 for forecasting employee overhead for an up-coming forecast period may include analysis of historical data for recommending shrinkage values for this period. In this regard, the forecasting module may be configured with various parameters that should be analyzed for trends in order to recommend a shrinkage value for the up-coming forecast period. Such parameters may include, for example, the particular time period that is involved (e.g. particular day of the week, week of the month, and/or month of the year), special events, agent profiles, agent preferences, and/or the like.

According to one embodiment, the trends that emerge from the study of the historical data may be used by the forecasting module 24 to correlate these parameters to shrinkage types, levels of shrinkage, affected shrinkage time periods, and the like. In one example, an average may be calculated based on various historical shrinkage values associated with various parameters for which a trend is detected, and use the average value as the suggested shrinkage value for a forecast period for which the parameters would apply. In some embodiments, weights may be assigned to the different parameters based on how predictive the particular parameter is for forecasting a future shrinkage.

As an example of patterns that may emerge for time periods, higher shrinkages may be observed on Fridays during the months that coincide with school vacations (e.g. June-August). Higher shrinkages may also be observed during those months associated with the flu season.

With respect to special events, shrinkage patterns may emerge for certain holidays, sporting events, and other types of events. Exemplary events may be Easter, Valentine's day, revenue reporting of major companies, Super Bowl, earthquake, Oscars, and the like. According to one embodiment, the forecasting module may be configured to identify events that are scheduled to occur during an up-coming forecast period, and correlate those events to a particular type of shrinkage, level of shrinkage, and time period for the shrinkage, based on historical data patterns. For example, the forecasting module may identify, either automatically based on analysis of available information sources, or manually based on user input, that the Super Bowl is to occur during an up-coming forecast time period. Analysis of impact of the Super Bowl historically to the shrinkage numbers may be used to predict the shrinkage for the forecast time period. In this regard, the historical shrinkage data collected for a particular day may be tagged with an identifier of a special event occurring on that day.

In another example, a Friday before a 3-day holiday may be labeled as a "pre-holiday Friday." If the current forecast period includes a pre-holiday Friday, historical shrinkage data labeled with such tags may be analyzed for trends, and the analysis used for setting a predicted value for the up-coming pre-holiday Friday.

According to one embodiment, profiles and preferences of agents employed by a contact center may be used as a parameter for predicting shrinkage for a forecast period. For example, if 30% of agents used by a contact center are students, shrinkage of those agents may be predicted for those months that coincide with spring breaks, vacations, graduations, finals, and the like. Historical data may be evaluated for determining the level of shrinkage associated with the specific agent group. If the historical data is not available, an assumption may be made that all 30% of student agents will take a vacation or call in sick during those time periods.

According to one embodiment, the WFM builder 20 takes into account the forecasted shrinkage, staffing, interaction volume, and the like, and generates a master schedule for the contact center with specific assignments of agents to particular activities, time slots, and the like. According to one embodiment, the WFM web component for supervisors provides an intra-day schedule view that allows the supervisor to make real-time adjustments to a schedule. For example, the supervisor may insert exceptions, edit or change shift start and end times, assign meetings, enter time off for an agent who has suddenly gone home ill, change the activities agents are working on, or make other changes to the schedule to improve contact center performance and to make the schedule reflect actual contact center circumstances.

According to one embodiment, the scheduling algorithm executed by the WFM builder 20 minimizes the over and under-staffing of agents against the forecasted staffing requirements, while meeting the configured working rules. However, since schedules may be built several weeks in advance, a variety of circumstances may cause the schedule to become suboptimal by the time a particular schedule day arrives. Some examples include: 1) contact center management may have re-forecasted volumes and staffing for the day; 2) agents may have called in sick or been granted time off; 3) existing agent schedules may have been manually adjusted; 4) additional agents may have been added into the schedule; or 5) meetings or other types of exceptions may have been added to the schedule.

According to one embodiment, analysis of actual shrinkage levels during a current day may be used to forecast and schedule shrinkage for the remaining of the day. Such intra-day forecasting and scheduling may be based on analysis of actual shrinkage levels during, for example, the first few hours of contact center operation. The algorithm for such intra-day forecasting may be similar to intra-day forecasting of traffic volume for the contact center. According to one embodiment, singular value decomposition may be used to extract regular patterns useful for forecasting.

Intra-day shrinkage forecasting may result in increased efficiency in contact center operations. For example, if during a current day for which a schedule has already been built, two agents that attended a contact center function the night before call in sick due to food poisoning, and such shrinkage is not already built-into the schedule, the forecasting module may be invoked to re-forecast shrinkage for the remaining day based on this unplanned event. For example, the forecasting algorithm may identify the members that attended the contact center function the night before, and forecast that such people will also call in sick. In response to the intra-day re-forecast, the WFM builder may be invoked, for example, to receive a recommendation on how to modify the existing schedule based on the re-forecast. Based on the recommendation, the supervisor may take action to arrange agents to work overtime, call in part-time or work-from-home agents, re-assign agent activities, cancel training sessions or meetings, and the like.

According to some embodiments, shrinkages may also be reversed. For example, a training session scheduled for a particular time period may be suddenly canceled, and the agents scheduled to attend the training may suddenly be available for a work activity. According to one embodiment, such unplanned changes to shrinkage during the course of the day may cause the WFM builder 20 to recommend a re-optimized work assignment of agents. For example, the recommendation may be to cancel the shift for certain-work-from-home agents if the contact for such agents would allow such last-minute canceling. The recommendation may be to assign the agents who have suddenly become available for work, to other tasks that may not be scheduled to be handled during the particular time period.

According to one embodiment, the WFM builder 20 is configured with a re-optimization wizard that allows the supervisor to select the date, start time, affected agents, and the set of schedule items to be re-optimized. For example, the wizard provides the option to re-optimize the placement of: 1) breaks; 2) meals and breaks; 3) activity sets, task sequences, and/or activities; 3) breaks, meals, activity sets, task sequences, or activities without affecting shift start/end times; and 4) breaks, meals, activity sets, task sequences, or activities, along with shift start/end times. In this manner, the re-optimization wizard gives the supervisor flexibility if the supervisor does not wish to change certain shift items or work activities if it is anticipated that it may be difficult for agents to adjust to those changes. For example, if agents use their meal breaks to go out of the office and go to appointments, it may not be desirable to change these times once they have been published. Additionally, a supervisor may choose to exclude from re-optimization any agents whose schedules have already been manually edited. For example, the supervisor may have already spent time manually adjusting shift items or work activities for an agent (for example, the supervisor moved meals or breaks based on a particular request from an agent), and it may not be desirable to lose those changes.

FIGS. 4-7 are exemplary screen shots of a supervisor GUI provided by the WFM web component 22 for forecasting shrinkage for the workforce according to one embodiment of the invention. As shown in the screen shot of FIG. 4, the overhead forecasting process starts with the supervisor transmitting a command to forecast overheads by selecting a forecast overhead option 400 from a list of available menu options. The forecasting module 24 receives the command and displays a forecast shrinkage screen in response.

Figure 5:
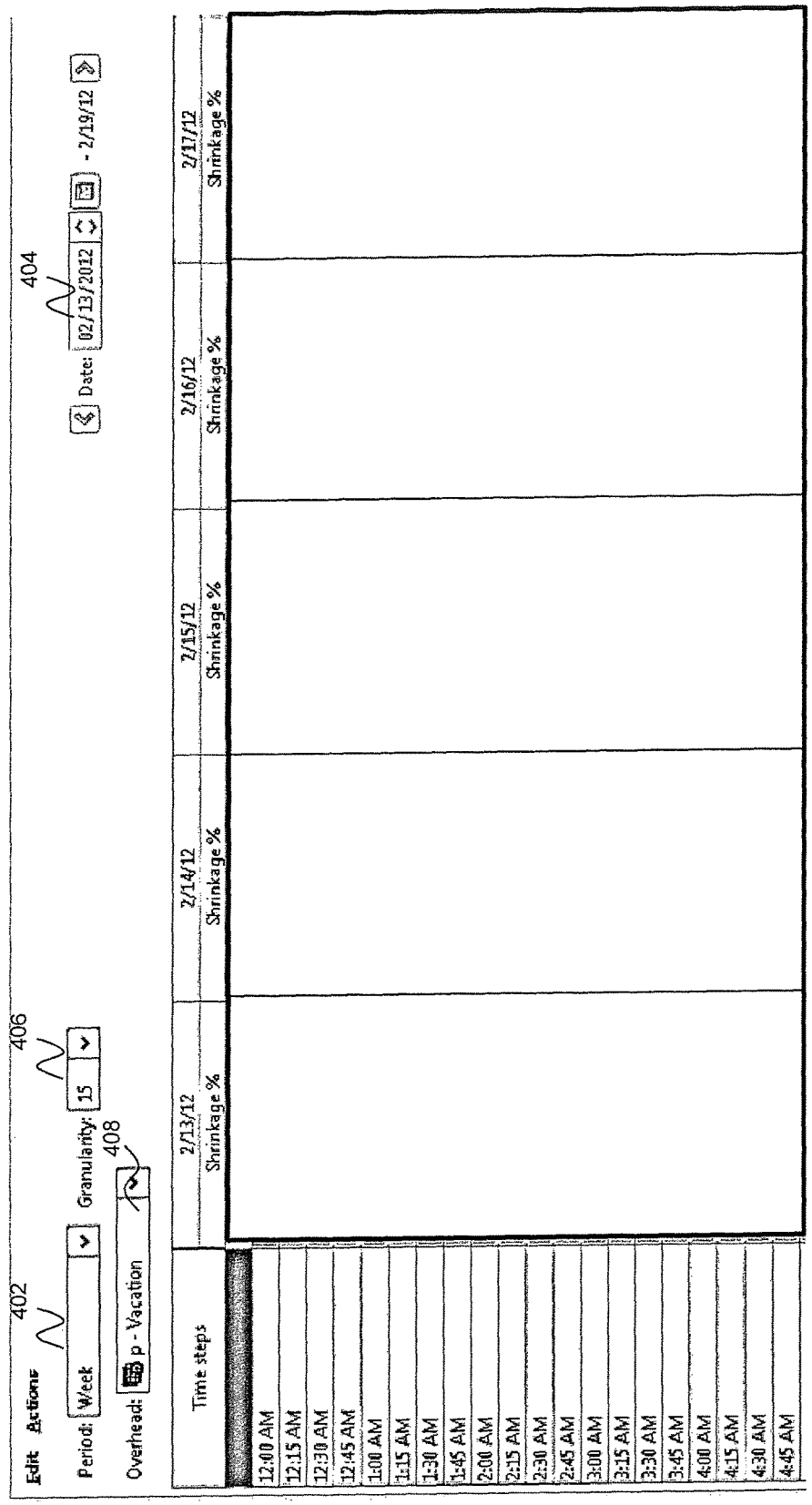

FIG. 5 is a screen shot of an example forecast shrinkage screen provided by the supervisor GUI according to on embodiment of the invention. The screen includes a period field 402 for selecting/inputting a time period (e.g. one week) for which the forecast is to be performed, a start date field 404 for selecting/inputting a start date for the forecast, and a granularity field 406 for selecting/inputting the length of the time interval for which a shrinkage value is to be forecast (e.g. 15 minutes). An overhead field 408 allows the selection/input of a schedule state group associated with overheads for which a shrinkage forecast is to be made. In the illustrated example, the forecast is for a "vacation" schedule state group for predicting shrinkage due to employees taking vacations.

Figure 6:
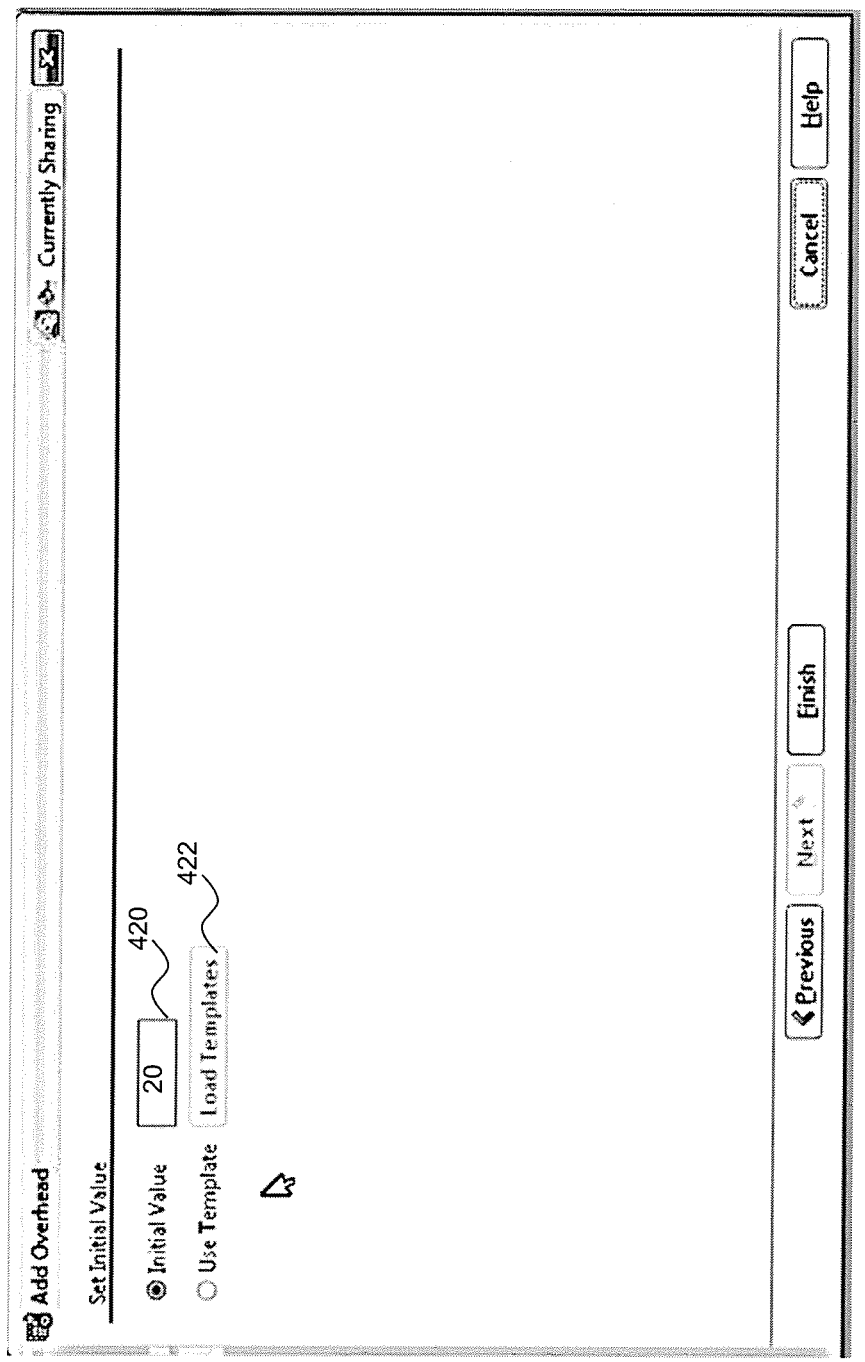

According to one embodiment, the supervisor may manually enter forecast shrinkage values for each time interval of each day for which forecasting is to be done. FIG. 6 is a screen shot of an example screen for entering a shrinkage value according to one embodiment of the invention. An initial value field 420 allows the supervisor to manually enter an initially predicted shrinkage value (e.g. 20%) for populating the shrinkage fields. The supervisor may also select amongst existing templates for forecasting the shrinkage values upon selecting a templates option 422.

Figure 7:
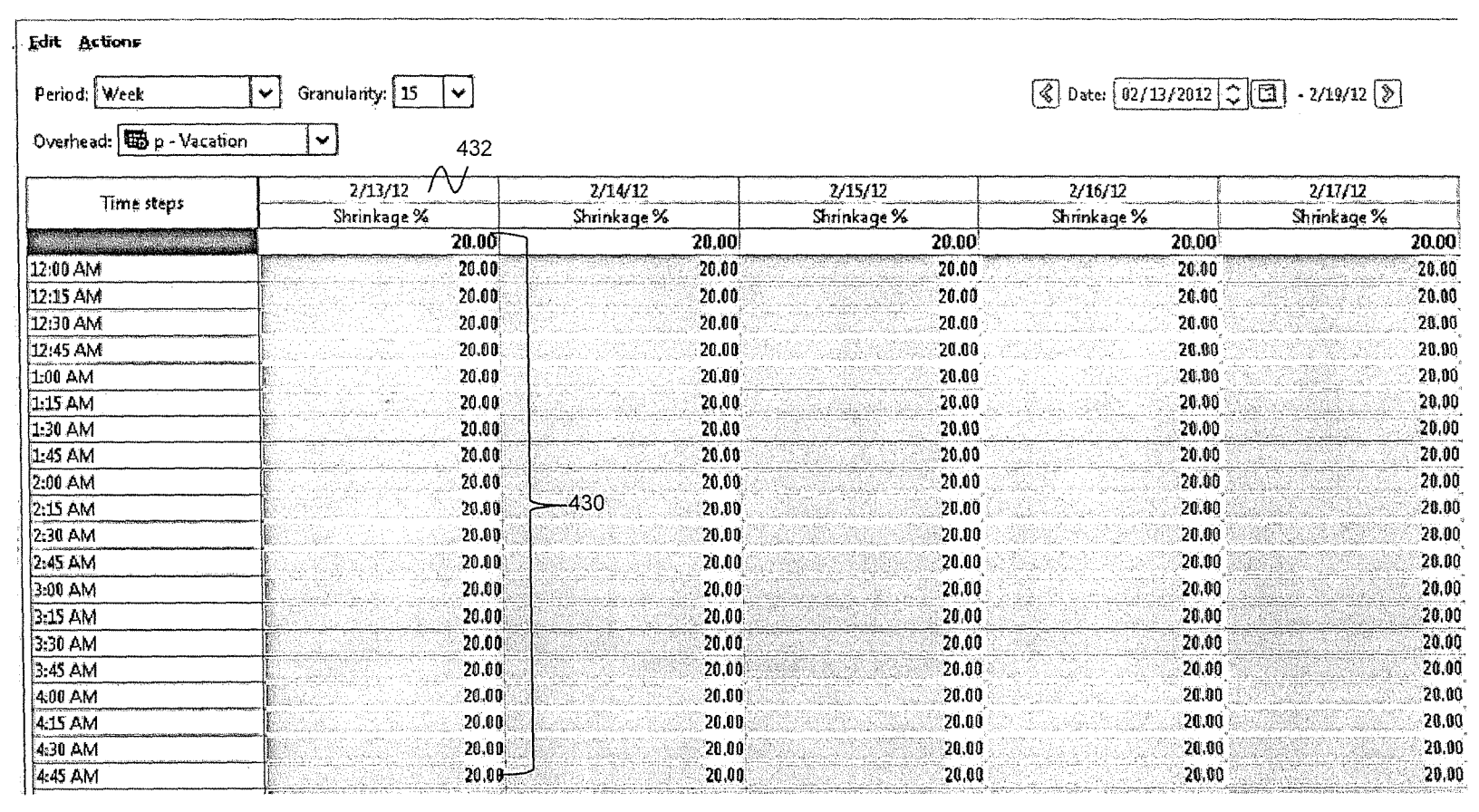

FIG. 7 is a screen shot of the exemplary forecast shrinkage screen of FIG. 5, where the shrinkage field 430 corresponding to each time interval of each forecast day 432 is populated with the initially predicted shrinkage value. According to one embodiment, the supervisor may modify the predicted shrinkage values for a particular time period. For example, employees who start work at 8:00 am are not predicted to take a break immediately, but instead, wait a couple of hours prior to taking the break. According to this example, the predicted shrinkage at 8:00 am may be zero while the predicted shrinkage at 10:00 am is 30%. In this manner, the forecasting module forecasts shrinkage at a finer level of granularity, such as, discrete time intervals, where the shrinkage value may be different for each interval. This is different from applying the same shrinkage to the entire day, which is typical in existing WFM systems.

Upon completion of shrinkage forecasting, the forecast may be stored as a master shrinkage forecast in the mass storage device 14.

The supervisor may next want to forecast staffing based on the published master shrinkage forecast. FIGS. 8-11 are exemplary screen shots of a supervisor GUI provided by the WFM web component 22 for forecasting staffing according to one embodiment of the invention. As shown in the screen shot of FIG. 8, the supervisor may select a forecast staffing option 440 (FIG. 4) from the list of available menu options to initiate the staffing forecast process. The forecasting module 24 receives the command to forecast staffing and in response, executes a staffing forecast algorithm for calculating the base-line number of employees that are predicted to be needed to be working on a given activity at each time interval in order to handle the predicted volume for that activity at that time interval, which is hereinafter referred to as a calculated staffing value. According to one embodiment, the calculated staffing value takes into account the forecast volume and other considerations, but does not take into account predicted shrinkages.

Figure 9:
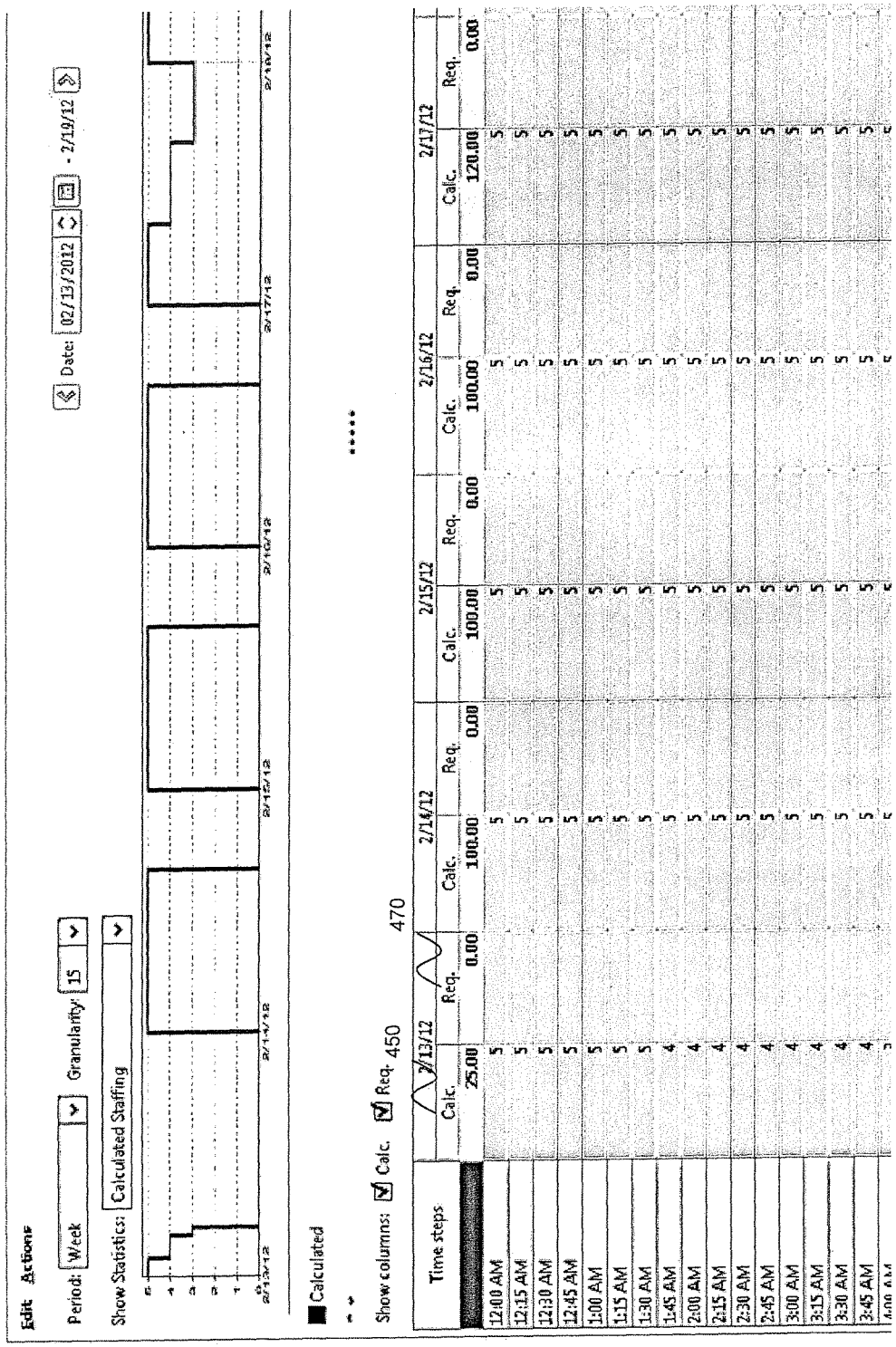

FIG. 9 is a screen shot of an exemplary forecast staffing screen provided by the supervisor GUI which includes a calculated column 450 for each time period for displaying the calculated staffing value for that period. In the illustrated example, the total calculated staffing value for Feb. 13, 2012 is a total of 25 full-time-equivalent employees. The calculated staffing value at each time interval may vary, however, depending on, for example, the predicted interaction volume at that interval. For example, the calculated staffing value at 12:00 am is five employees while the value at 1:45 am decreases to four employees.

According to one embodiment, the forecasting module 24 may receive a command to adjust the calculated staffing value based on forecast overheads, which adjusted value is hereinafter referred to as a required staffing value. In response to such a command, the forecasting module 24 executes the staffing forecast algorithm for calculating the required staffing value. According to one embodiment, the required staffing value calculation is based on the calculated staffing value and forecast shrinkage values.

Figure 10:
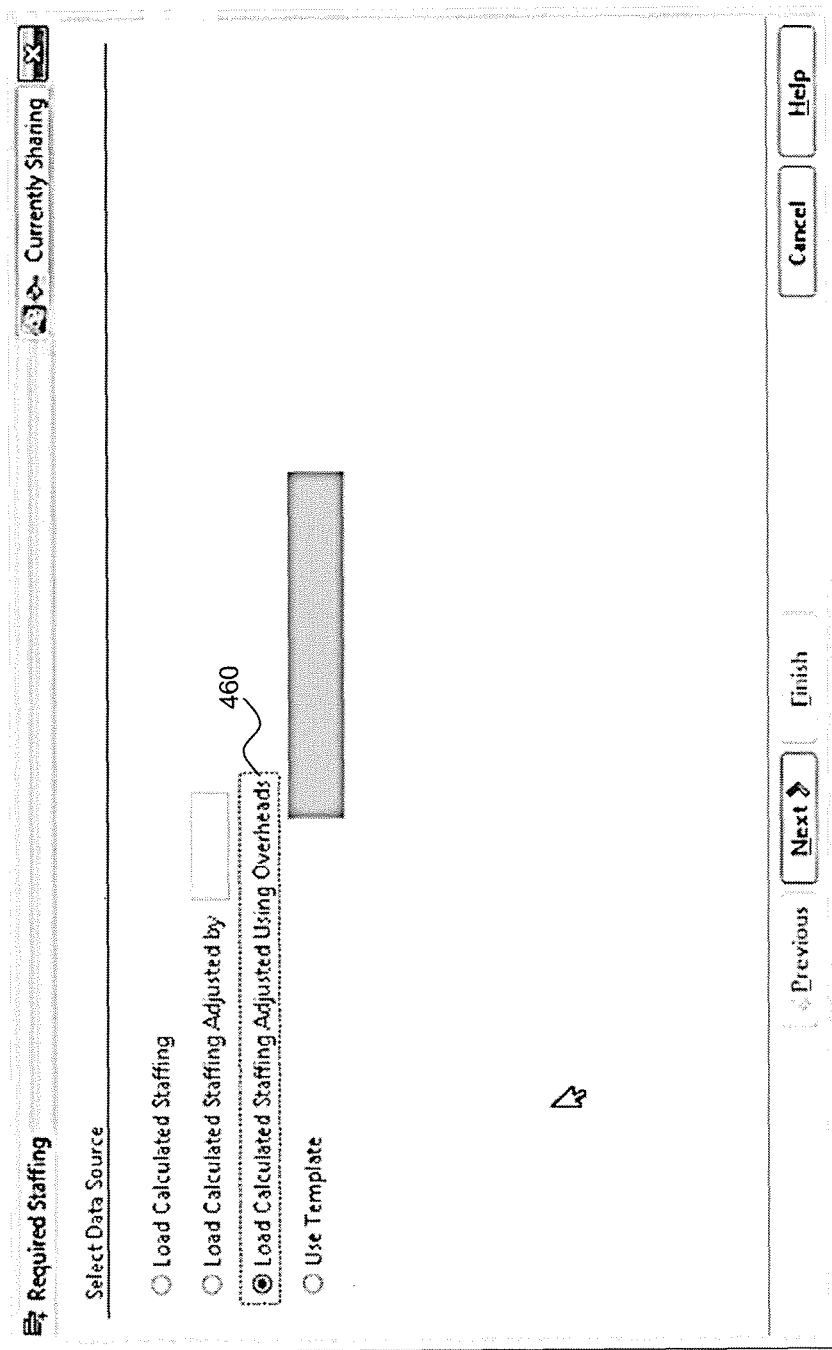

FIG. 10 is a screen shot of an exemplary screen provided by the supervisor GUI which includes an option 460 to load the adjusted staffing value to the forecast staffing screen. In response to the command, the forecast staffing values are calculated and/or loaded and displayed on the forecast staffing screen.

Figure 11:
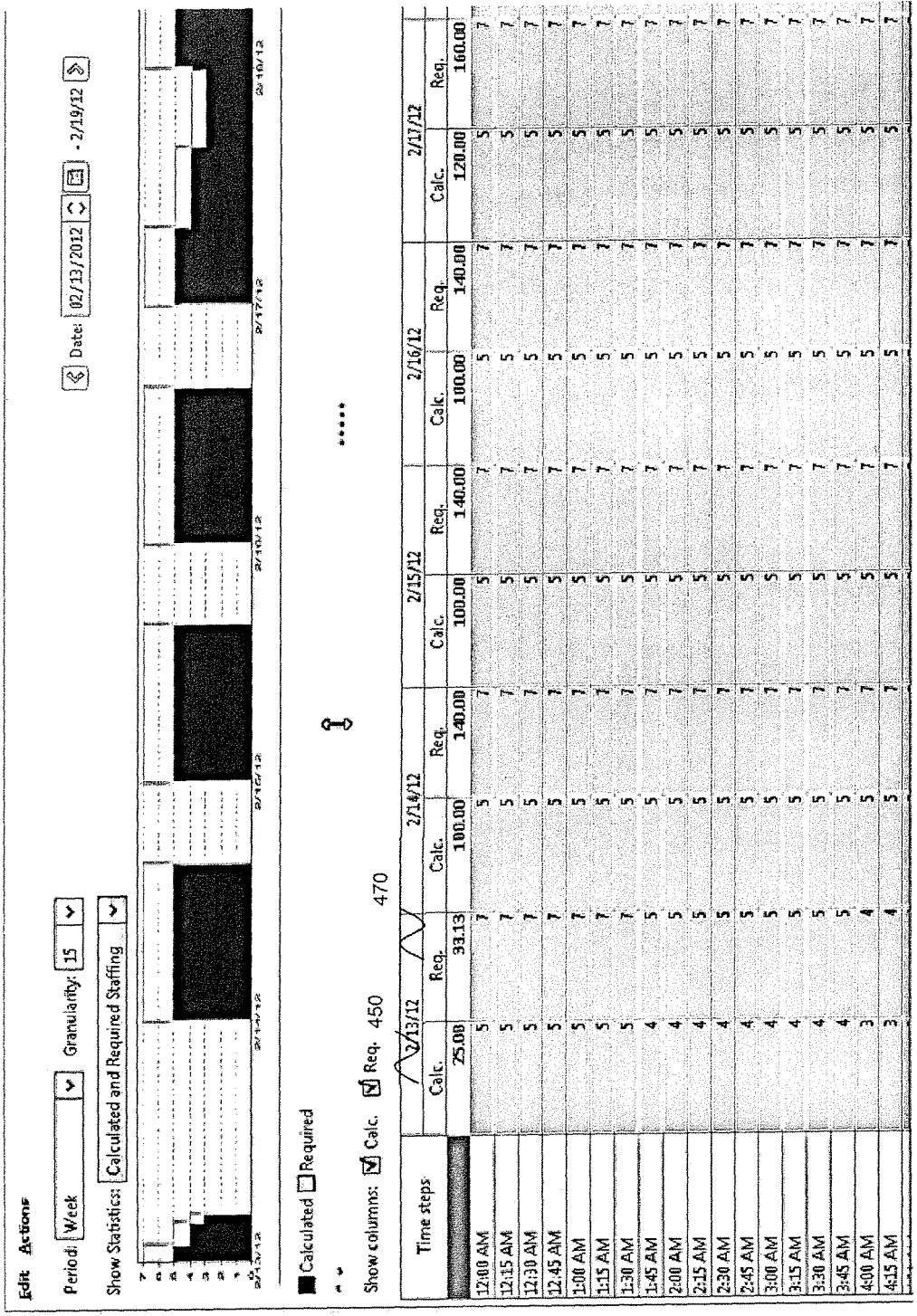

FIG. 11 is a screen shot of the forecast staffing screen of FIG. 9, displaying exemplary required staffing values under a required staffing field 470. In the illustrated example, the required staffing value is higher than the calculated staffing value in the calculated staffing field 450, as it takes into account the 20% shrinkage overhead that was forecast for this time period.

Figure 12:
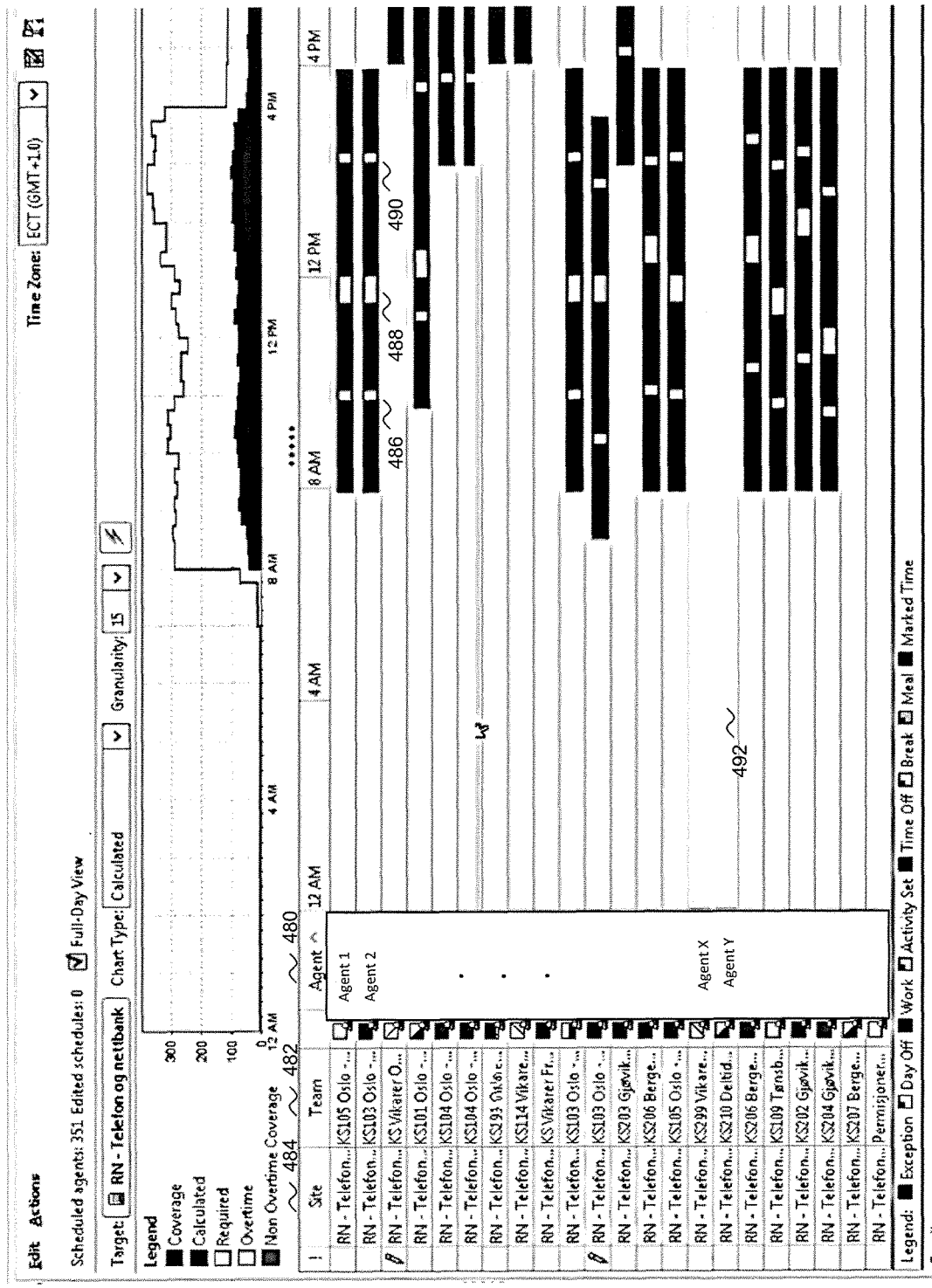
FIG. 12 is an exemplary screen shot of a master schedule built based on forecasted staffing needs according to one embodiment of the invention.

FIG. 12 is an exemplary screen shot of a master schedule built based on forecasted staffing needs according to one embodiment of the invention. The master schedule, once published, may be accessible for view by agents and supervisors via the WFM web component. The WFM web component may provide inter-day as well as intra-day view of the schedules. The master schedule shown in FIG. 12 provides an exemplary intra-day view of the schedule for a particular day, including information on the agents 480, teams 482, and sites 484 to which the schedule applies. The exemplary schedule further depicts the various schedule state groups for each agent. For example, Agent 1 and Agent 2 are scheduled to start their work shift at 8:00 am and be in a coverage state until they take a break around 9:30 am. The break around 9:30 am is marked via indicia 486 which is associated with a break schedule state group. The agents resume coverage and around 11:30 am, they take a meal break as depicted via indicia 488 assigned to a meal state group. The agents take another break at 2:30 pm, as depicted via indicia 490 associated with a break schedule state group, and end their work shift at 4 pm. Agent X and Agent Y, however, are scheduled to be on vacation on this particular day, as depicted via indicia 492 associated with a vacation schedule state group. The different indicia may be different colors, graphics, icons, or any other visual representation.

According to one embodiment, the WFM server 12 allows contact centers to create customized overhead schedule states and/or groups. Customized states may be associated or grouped into a particular schedule state group which may also be customized by the supervisor. The custom overhead schedule state group may then be assigned a particular visual indicator such as, for example, a particular color code. For example, the contact center may create separate schedule states for different types of training, meetings, time off categories, meal breaks, and the like. Custom schedule states for meal breaks may include, for example, breakfast, lunch, and dinner. Custom schedule states for time-off may be created to identify specific reasons for the time-off, such as, for example, time off for competence exams, competence certification, holidays, medical treatments, and the like.

Figure 13:
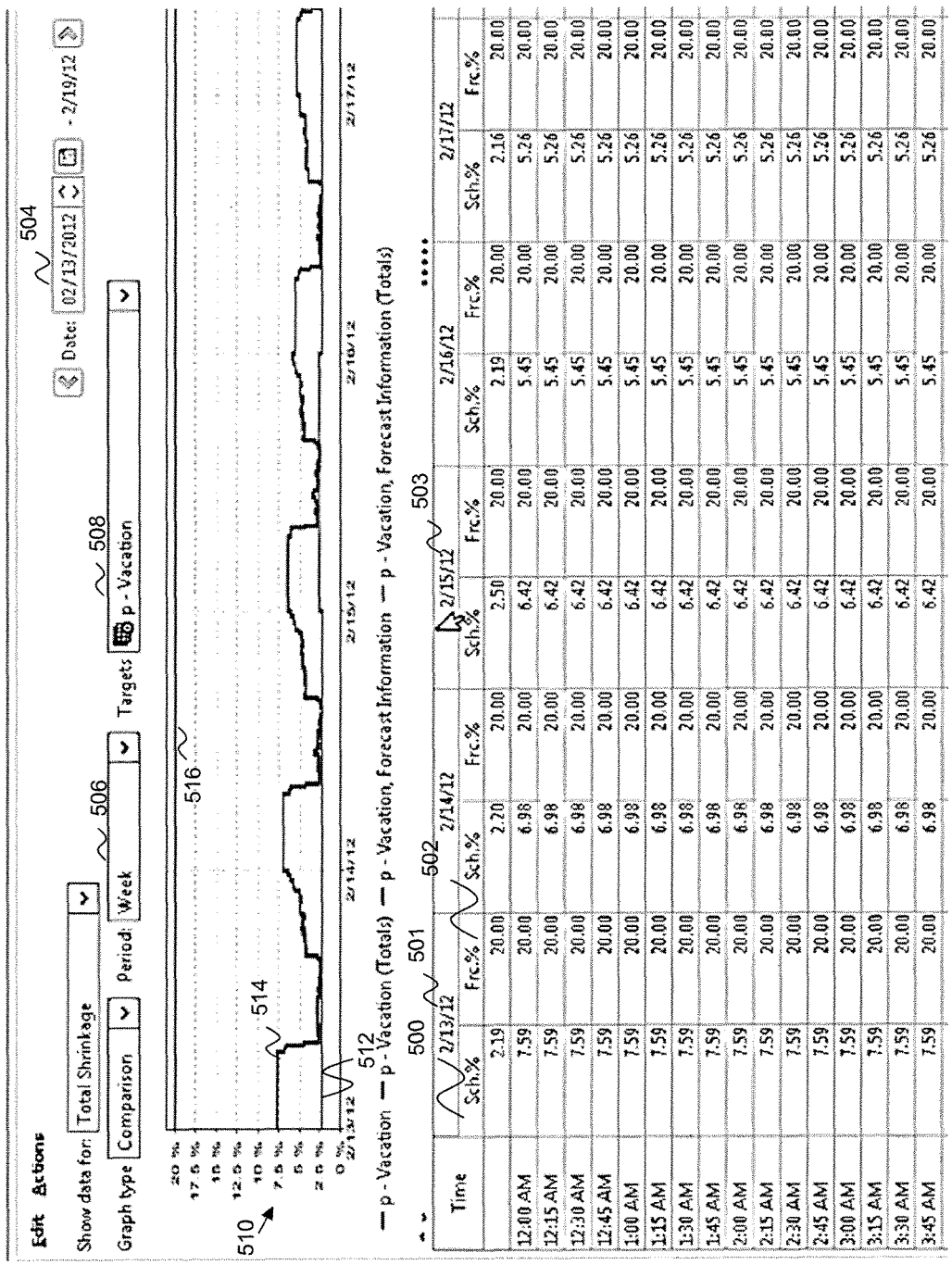
FIG. 13 is an exemplary screen shot of a comparison screen for providing a comparison of scheduled shrinkage values against forecast shrinkage values according to one embodiment of the invention.

FIG. 13 is an exemplary screen shot of a comparison screen provided by WFM web component 22 for providing a comparison of scheduled shrinkage values against forecast shrinkage values according to one embodiment of the invention. In this regard, the comparison screen includes a start date field 504 and a period field 506 for selecting/inputting a time period for which the comparison is to be done. The comparison screen further includes field 508 for selecting/inputting the type of overhead that is desired to be compared (e.g. vacation overhead). In addition, the screen provides for each selected time period, a scheduled field 500 and a forecast field 502 for respectively displaying the scheduled shrinkage values and the forecast shrinkage values for the selected type of overhead. The scheduled shrinkage values are derived from the corresponding schedule, such as, for example, the schedule displayed in the screen shot of FIG. 12. The number of agents scheduled to be in the selected overhead state is compared against the total number of agents scheduled at that time period for determining the scheduled overhead for the particular overhead state at that time period. In the exemplary comparison screen of FIG. 13, 7.59% of agents scheduled at 12:00 am on Feb. 13, 2012, are scheduled to be in the vacation state. The forecast value for this time period, however, is 20%.

The exemplary comparison screen of FIG. 13 also includes a comparison graph 510 for displaying a scheduled inter day line 512 depicting a total percentage of full-time-equivalent agents scheduled to be on vacation from day to day, which, in this example, hovers around 2.5%. The graph further displays a scheduled intra-day line 514 depicting the percentage of agents scheduled to be on vacation throughout each day. The graph also displays forecasted inter-day and intra-day lines 516 for depicting respectively day-to-day and intra-day percentages of agents forecast to be on vacation. In the illustrated example, the inter-day and intra-day values are the same.

According to one embodiment a supervisor may actuate a template option (not shown) from the comparison screen to store the scheduled shrinkage values in a template for later use as the predicted shrinkage values for a future forecast period.

Figure 14:
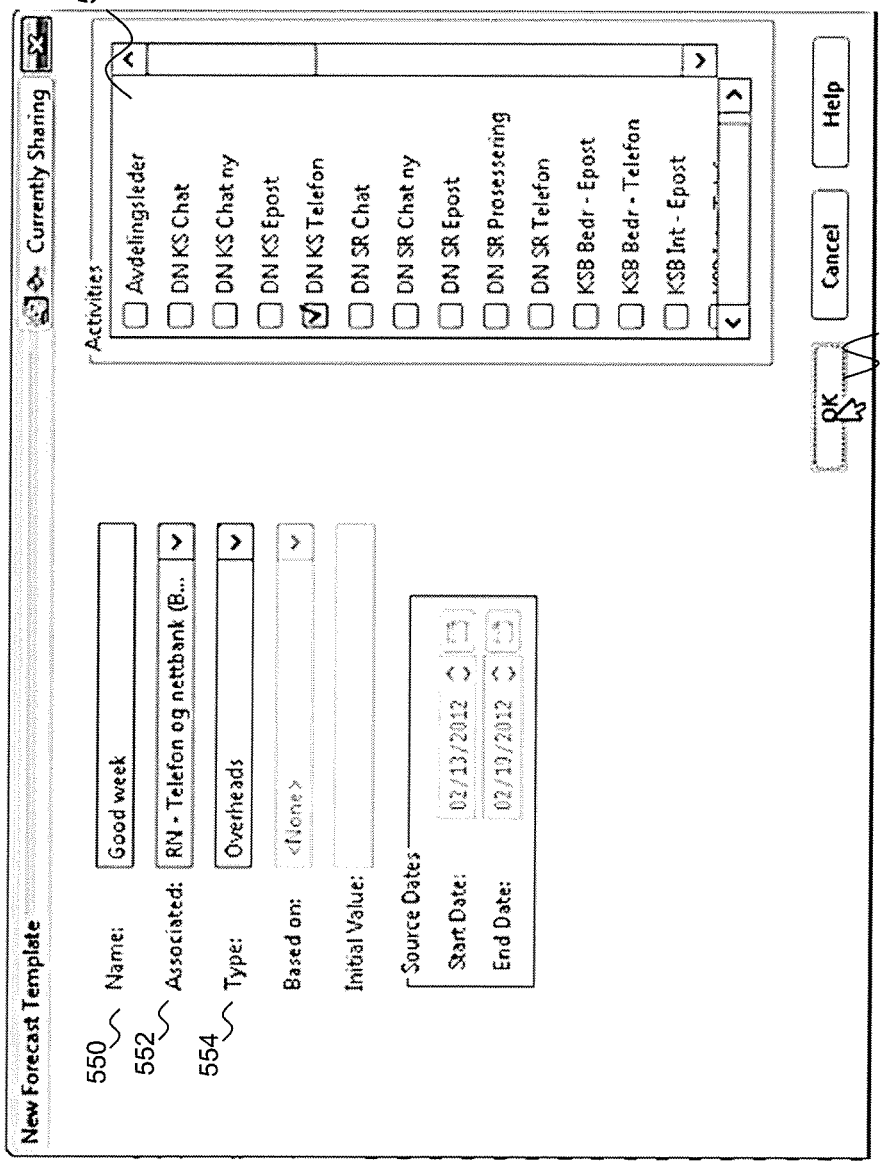
FIG. 14 is a screen shot of a template screen that is displayed in response to actuating a template option according to one embodiment of the invention.

FIG. 14 is a screen shot of a template screen that is provided by the WFM web component 22 in response to actuating the template option according to one embodiment of the invention. The template screen prompts the user for information about the new template that is to be generated. In this regard, the template screen includes a name field 550 for receiving input of a desired name of the file in which to save the template data, an associated field 552 for receiving input of an organization object to which the template belongs, a type field 554 for receiving input of a type of data (e.g. overhead data) to be stored in the template, and a list of activities 556 that may be selected depending on the activity (e.g. handling voice calls) to which the data pertains. Selection of an OK button 558 causes the scheduled shrinkage values to be saved as a template data file in the mass storage device.

According to one embodiment, one or more templates may be used to automatically populate shrinkage fields for forecast time periods based on stored shrinkage values in one or more overhead templates. In this regard, instead of manually entering the shrinkage values, the supervisor selects the templates option 422 as shown in FIG. 6. In response, the forecasting module 24 retrieves a list of available templates that may be used for populating the forecast shrinkage fields.

FIG. 15 is a screen shot of an exemplary list of available templates available for selection by the supervisor according to one embodiment of the invention. Information of the available templates may be displayed, such as, for example, their names 600, types 602, and organizational objects 604. The content of a particular template file may also be displayed in section 606 of the screen.

Figure 16:
FIG. 16 is a screen shot of a template selection screen that may be displayed in response to actuating a templates option according to one embodiment of the invention.

FIG. 16 is a screen shot of a template selection screen that may be displayed in response to actuating the templates option 422 according to one embodiment of the invention. The template selection screen includes a list of templates 620 that a user may select, along with start and end dates 622 that the user may manipulate to identify the forecast period to which the template data is to be applied, and the days of the week 624 in the template that are to be used for populating the same days in the selected forecast period. After the appropriate selections are made, the template is placed in an applied 626 section of the screen. The user may select another template from the list to populate different forecast time periods and/or different days of the week. In the illustrated example, a first template 628 is selected for being applied for Monday and Wednesday for the forecast period starting on Feb. 13, 2012 and ending on Feb. 19, 2012, and a second template 630 is selected for being applied for Tuesday, Thursday, Friday, Saturday, and Sunday for the same forecast period.

FIG. 17 is an exemplary screen shot of a forecast shrinkage screen displaying forecast shrinkage values based on the templates selected in FIG. 16. The first template 628 is assumed to store the scheduled shrinkage values appearing in the scheduled fields 500 in the comparison screen of FIG. 13. Thus, the forecast shrinkage value for Monday 650 and Wednesday 652 for the new forecast period is taken from the template data that correspond to scheduled shrinkage values calculated for Monday 501 and Wednesday 503 in the comparison screen of FIG. 13. In this regard, the forecasting module retrieves the shrinkage values in the shrinkage fields stored in the template for the appropriate days (e.g. Monday and Wednesday), and automatically populates the corresponding fields of the forecast shrinkage screen for the same day (e.g. Monday 650 and Wednesday 652). The same is true for the remaining days (Tuesday, Thursday, Friday, Saturday, and Sunday), except that the shrinkage values for those days come from the second template 630. In this manner, the shrinkage values extracted from the templates are set as the forecast shrinkage values for the forecast time period.

It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by claims and their equivalents rather than the foregoing description.

The invention claimed is:

1. A method for forecasting and generating staffing schedules in a contact center, the method comprising:
   receiving, by a processor, data from a statistics server regarding an interaction volume over an initial period of time;
   receiving, by the processor, a request from a user interface to forecast a workload for a first time period corresponding to the initial period of time;
   automatically forecasting, by the processor executing a forecasting module, the workload for the first time period based on the interaction volume for the initial period of time;
   automatically forecasting, by the processor executing the forecasting module, resource overhead for the first time period based on historical shrinkage values corresponding to the first time period;
   automatically forecasting, by the processor executing the forecasting module, needs for the contact center based on the forecasted workload and resource overhead for the first time period;
   automatically building, by the processor executing a builder module, a first work schedule by assigning agents based on the forecasted needs and available personnel for optimizing resources of the contact center;
   transmitting, by a call server and the processor, a signal to a switch to route a communication to an agent device based on the first work schedule;

receiving, by the processor, intra-day shrinkage data from the statistics server over a second period of time; and generating, by the processor executing the builder module, a second work schedule for re-optimizing the resources of the contact center based on the intra-day shrinkage data.

2. The method of claim 1, where the method further includes receiving a definition of the one or more shrinkage values from a user interface.

3. The method of claim 1, where the method further includes receiving a selection of one or more templates as the one or more shrinkage values from a user interface.

4. The method of claim 1, where the method further includes automatically analyzing historical data to determine the one or more shrinkage values.

5. The method of claim 1, where the method further includes:

receiving a selection of one or more templates corresponding to one or more scheduled shrinkage values from a user interface;

automatically analyzing historical data to determine one or more historical shrinkage values; and automatically combining at least one scheduled shrinkage value with at least one historical shrinkage value to determine at least one of the one or more shrinkage values.

6. The method of claim 4, where the step of automatically analyzing historical data to determine the one or more shrinkage values further comprises identifying at least one trend in the historical data associated with at least one parameter and utilize the identified trend and associated parameter to determine the one or more shrinkage values.

7. The method of claim 6, where the parameter relates to at least one of a time of day, a day of the week, a week of the month, a month, an agent profile, an agent preference, an agent group, and a particular event.

8. The method of claim 1, where the one or more shrinkage values correspond to one or more timer intervals within the first time period.

9. The method of claim 1, where the steps of automatically forecasting the resource overhead, automatically forecasting needs, and automatically building a first work schedule are repeated in response to receiving a re-forecast request.

10. The method of claim 1, where the method further includes:

monitoring actual shrinkage during a first portion of the first time period;

re-forecasting a shrinkage value for a second portion of the first time period; and updating the work schedule for the second portion of the first time period based on the re-forecasted shrinkage value.

11. A system for forecasting and generating staffing schedules in a contact center comprising:

one or more processors; and memory coupled to the one or more processors, the memory storing instructions which, when executed by the one or more processors, cause the one or more processors to operate to:

receive data from a statistics server regarding an interaction volume over an initial period of time;

receive a request from a user interface to forecast a workload for a first time period corresponding to the initial period of time;

automatically forecast, by the one or more processors executing a forecasting module, the workload for the first time period based on the interaction volume for the initial period of time;

automatically forecast, by the one or more processors executing the forecasting module, resource overhead for the first time period based on historical shrinkage values corresponding to the first time period;

automatically forecast, by the one or more processors executing the forecasting module, needs for the contact center based on the forecasted workload and resource overhead for the first time period;

automatically build, by the one or more processors executing a builder module, a first work schedule by assigning agents based on the forecasted needs and available personnel for optimizing resources of the contact center;

transmit, via a call server, a signal to a switch to route a communication to an agent device based on the first work schedule;

receive intra-day shrinkage data from the statistics server over a second period of time; and generate, by the one or more processors executing the builder module, a second work schedule for re-optimizing the resources of the contact center based on the intra-day shrinkage data.

12. The system of claim 11, where the memory further includes instructions configured to cause the one or more processors to operate to receive a definition of the one or more shrinkage values from a user interface.

13. The system of claim 11, where the memory further includes instructions configured to cause the one or more processors to operate to receive a selection of one or more templates as the one or more shrinkage values from a user interface.

14. The system of claim 11, where the memory further includes instructions configured to cause the one or more processors to operate to automatically analyze historical data to determine the one or more shrinkage values.

15. The system of claim 14, where the instructions that cause the one or more processors to automatically analyze historical data to determine the one or more shrinkage values further comprise instructions to cause the one or more processors to identify at least one trend in the historical data associated with at least one parameter and utilize the identified trend and associated parameter to determine the one or more shrinkage values.

16. The system of claim 15, where the parameter relates to at least one of a time of day, a day of the week, a week of the month, a month, an agent profile, an agent preference, an agent group, and a particular event.

17. The system of claim 11, where the memory further includes instructions configured to cause the one or more processors to operate to:

receive a selection of one or more templates corresponding to one or more scheduled shrinkage values from a user interface;

automatically analyze historical data to determine one or more historical shrinkage values; and automatically combine at least one scheduled shrinkage value with at least one historical shrinkage value to determine at least one of the one or more shrinkage values.

18. The system of claim 11, where the one or more shrinkage values correspond to one or more timer intervals within the first time period.

19. The system of claim 11, where the memory further includes instructions configured to cause the one or more processors to operate to receive a re-forecast request and, responsive thereto, repeat execute the instructions that cause the one or more processors to automatically forecast the resource overhead, automatically forecast needs, and automatically build a first work schedule.

20. The system of claim 11, where the memory further includes instructions configured to cause the one or more processors to operate to:
- monitor actual shrinkage during a first portion of the first time period;
- re-forecast a shrinkage value for a second portion of the first time period; and
- update the work schedule for the second portion of the first time period based on the re-forecasted shrinkage value.

\* \* \* \* \*